(12) United States Patent
Syu et al.

(10) Patent No.: US 10,423,848 B2
(45) Date of Patent: Sep. 24, 2019

(54) METHOD, SYSTEM, AND COMPUTER-READABLE RECORDING MEDIUM FOR LONG-DISTANCE PERSON IDENTIFICATION

(71) Applicant: Wistron Corporation, New Taipei (TW)

(72) Inventors: You-Jyun Syu, New Taipei (TW); Ching-An Cho, New Taipei (TW); Ming-Che Ho, New Taipei (TW)

(73) Assignee: Wistron Corporation, New Taipei (TW)

( * ) Notice: Subject to any disclaimer, the term of this patent is extended or adjusted under 35 U.S.C. 154(b) by 120 days.

(21) Appl. No.: 15/669,965

(22) Filed: Aug. 7, 2017

(65) Prior Publication Data

US 2018/0276487 A1    Sep. 27, 2018

(30) Foreign Application Priority Data

Mar. 24, 2017   (TW) .............................. 106109923 A

(51) Int. Cl.
*G06K 9/00*     (2006.01)
*G06K 9/44*     (2006.01)
*G06T 7/194*    (2017.01)
*G06T 7/155*    (2017.01)

(52) U.S. Cl.
CPC ..... *G06K 9/00892* (2013.01); *G06K 9/00201* (2013.01); *G06K 9/00255* (2013.01); *G06K 9/00288* (2013.01); *G06K 9/00369* (2013.01); *G06K 9/00926* (2013.01); *G06K 9/44* (2013.01); *G06T 7/155* (2017.01); *G06T 7/194* (2017.01); *G06T 2207/10028* (2013.01); *G06T 2207/30201* (2013.01)

(58) Field of Classification Search
CPC .......... G06K 9/00892; G06K 9/00201; G06K 9/00255; G06K 9/00369; G06K 9/00288; G06K 9/44; G06K 9/00926; G06T 7/155; G06T 7/194; G06T 2207/30201; G06T 2207/10028
See application file for complete search history.

(56) References Cited

U.S. PATENT DOCUMENTS 5,483,601 A *  1/1996  Faulkner ............ G06K 9/00033
                                                340/5.83
9,886,769 B1 *  2/2018  Tremaine ............. G06K 9/0063
(Continued)

*Primary Examiner* — Ming Y Hon
(74) *Attorney, Agent, or Firm* — JCIPRNET

(57) ABSTRACT

A method, a system, and a computer-readable recording medium for long-distance person identification are provided. The method is applicable to a system having an image capturing device and a depth sensor and includes the following steps. An image of a user is captured by using the image capturing device to generate a user image, and depth information of a user is detected by using a depth sensor to generate user depth information. Soft biometric features of the user are obtained according to the user image and the user depth information, where the soft biometric features include silhouette information and human body features. A soft biometric feature similarity of the user is calculated based on the soft biometric features by using registered information of registered users so as to output a person identification result accordingly.

23 Claims, 4 Drawing Sheets

(56) References Cited

U.S. PATENT DOCUMENTS

| | | | |
|---|---|---|---|
| 2007/0177767 A1* | 8/2007 | Miura | G06K 9/00 |
| | | | 382/115 |
| 2010/0148922 A1* | 6/2010 | Yamada | G06F 21/32 |
| | | | 340/5.82 |
| 2011/0210915 A1* | 9/2011 | Shotton | G06K 9/00369 |
| | | | 345/157 |
| 2013/0009865 A1* | 1/2013 | Valik | G06F 3/017 |
| | | | 345/156 |
| 2015/0088313 A1* | 3/2015 | Hamada | G05D 23/1917 |
| | | | 700/275 |
| 2015/0154453 A1* | 6/2015 | Wilf | G06K 9/00711 |
| | | | 382/103 |
| 2015/0154474 A1* | 6/2015 | Nada | G06F 21/32 |
| | | | 382/115 |
| 2016/0162673 A1* | 6/2016 | Kutliroff | G06F 21/32 |
| | | | 382/115 |
| 2016/0379225 A1* | 12/2016 | Rider | G06Q 30/0201 |
| | | | 382/116 |
| 2017/0032601 A1* | 2/2017 | Zhou | G07C 9/00158 |
| 2018/0039745 A1* | 2/2018 | Chevalier | G16H 10/60 |

* cited by examiner

METHOD, SYSTEM, AND COMPUTER-READABLE RECORDING MEDIUM FOR LONG-DISTANCE PERSON IDENTIFICATION

CROSS-REFERENCE TO RELATED APPLICATION

This application claims the priority benefit of Taiwan application serial no. 106109923, filed on Mar. 24, 2017. The entirety of the above-mentioned patent application is hereby incorporated by reference herein and made a part of this specification.

TECHNICAL FIELD

The disclosure relates to a method, a system, and a computer-readable recording medium for person identification, in particular to, a method, a system, and a computer-readable recording medium for long-distance person identification.

BACKGROUND

As the application of human-machine interface and the development of digitalization have advanced tremendously, person identification technology has been developed in a great extent and may be categorized into a short-distance aspect and a long-distance aspect.

The short-distance person identification may be further subcategorized into a human biometric feature basis and a human behaviour feature basis. The former technique (e.g. face, fingerprint, and iris recognition) has been well-developed and provides accurate results, and yet it may only be suitable for certain scenarios such as the user facing toward a camera lens or placing his/her finger on a fingerprint sensor. The latter technique (e.g. voiceprint or signature recognition) may also require the user to perform certain actions, and such technique may involve short-distance or contact requirements and thereby limit its application.

On the other hand, the long-distance person identification is a non-contact approach (e.g. gait and outfit recognition) that may provide a higher flexibility and may be suitable for surveillance or robot vision. However, human body features extracted by the long-distance approach may be insufficient and indefinite. In terms of gait recognition, despite its uniqueness and inherent difficulty of imitation, a sequence of images may be required for identification, and the entire process may be time-consuming. Moreover, the process of gait recognition may be affected by the user's injury or the comfortability of the user's outfit. In terms of outfit recognition, since there may exist a huge variation in a same user's outfits and since different users may have similar outfits, the uniqueness of such technique is not guaranteed. Hence, the existing solutions for long-distance person identification may not be effective.

SUMMARY OF THE DISCLOSURE

Accordingly, a method, a system, and a computer-readable recording medium are provided for long-distance person identification in an efficient, accurate, and non-contact fashion.

According to one of the exemplary embodiments, the method is applicable to a system having an image capturing device and a depth sensor and includes the following steps. An image of a user is captured by using the image capturing device to generate a user image, and depth information of a user is detected by using a depth sensor to generate user depth information. Soft biometric features of the user are obtained according to the user image and the user depth information, where the soft biometric features include silhouette information and human body features. A soft biometric feature similarity of the user is calculated based on the soft biometric features by using registered information of registered users so as to output a person identification result accordingly.

According to one of the exemplary embodiments, the system includes an image capturing device, a depth sensor, a memory, and a processor, where the processor is coupled to the image capturing device, the depth sensor, and the memory. The image capturing device is configured to capture images. The depth sensor is configured to detect depth information. The memory is configured to store registered information of registered users. The processor is configured to capture an image of a user by using the image capturing device to generate a user image, to detect depth information of the user by using the depth sensor to generate user depth information, obtain soft biometric features including silhouette information and body features of the user of the user according to the user image and the user depth information, to calculate a soft biometric feature similarity of the user based on the soft biometric features by using registered information of a plurality of registered users, and to output a person identification result according to the soft biometric feature similarity of the user.

According to one of exemplary embodiments, the computer-readable recording medium records computer program to be loaded into a processor of a person identification system to execute the steps of the aforementioned method.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
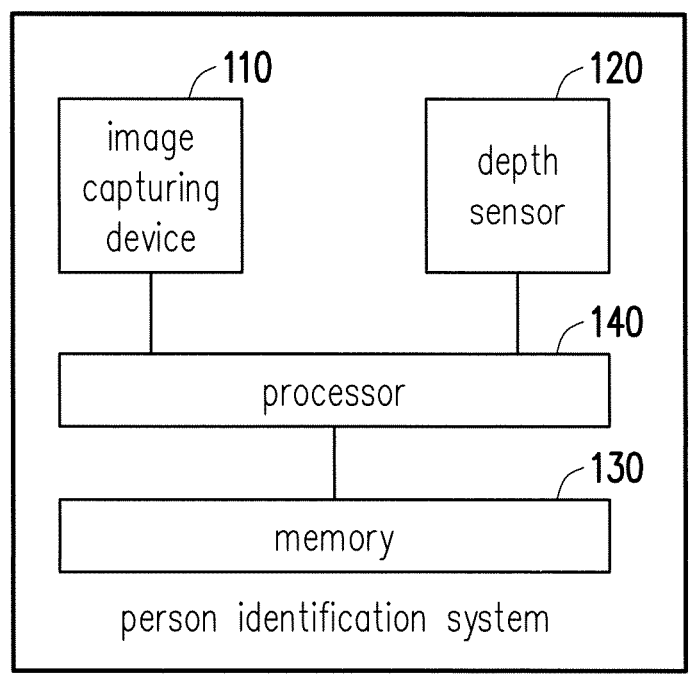
FIG. 1 illustrates a schematic diagram of a proposed person identification system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed person identification system in accordance with one of the exemplary embodiments of the disclosure. All components of the person identification system and their configurations are first introduced in FIG. 1. The functionalities of the components are disclosed in more detail in conjunction with FIG. 2.

Referring to FIG. 1, a person identification system 100 would include an image capturing device 110, a depth sensor 120, a memory 130, and a processor 140. The processor 140 would be coupled to the image capturing device 110, the depth sensor 120, and the memory 130. The image capturing device 110 and the depth sensor 120 would be disposed on a same side. In the present exemplary embodiment, the person identification system 100 may be an all-in-one electronic device such as a smart phone, a tabular computer, a laptop computer integrated with all the components. In another exemplary embodiment, the person identification system 100 may be a computer system having the memory 130 and the processor 140, and the image capturing device 110 and the depth sensor 120 may be externally connected to the computer system or the aforementioned electronic device. The person identification system 100 may be installed in a home environment or a hospital environment for surveillance purposes, and yet the disclosure is not limited in this regard.

The image capturing device 110 would be configured to capture images of its front and include a camera lens with an optical lens and sensing elements. The sensing element would be configured to sense intensity entering the optical lens to thereby generate images. The sensing element may be, for example, charge-coupled-device (CCD) elements, complementary metal-oxide semiconductor (CMOS) elements. The disclosure is not limited in this regard.

The depth sensor 120 would be configured to detect depth information of its front and may be categorized into an active depth sensor and a passive depth sensor. The active depth sensor may calculate the depth information of its front by actively transmit signals such as light source, ultrasound, laser, and so forth. On the other hand, the passive depth sensor may be, for example, another image capturing device which captures another image of its front from a different viewing angle simultaneously with the image capturing device 110. The two images captured by the two image capturing devices may be used for calculate the depth information.

The memory 130 would be configured to store data such as images and programming codes and may one or a combination of a stationary or mobile random access memory (RAM), a read-only memory (ROM), a flash memory, a hard drive, other similar devices or integrated circuits.

The processor 140 would be configured to control the operation among the components of the person identification system 100 and may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), an application processor (AP), other similar devices or a combination of aforementioned devices.

Detailed steps of how the person identification system 100 performs long-distance person identification would be illustrated along with each component hereafter.

Figure 2:
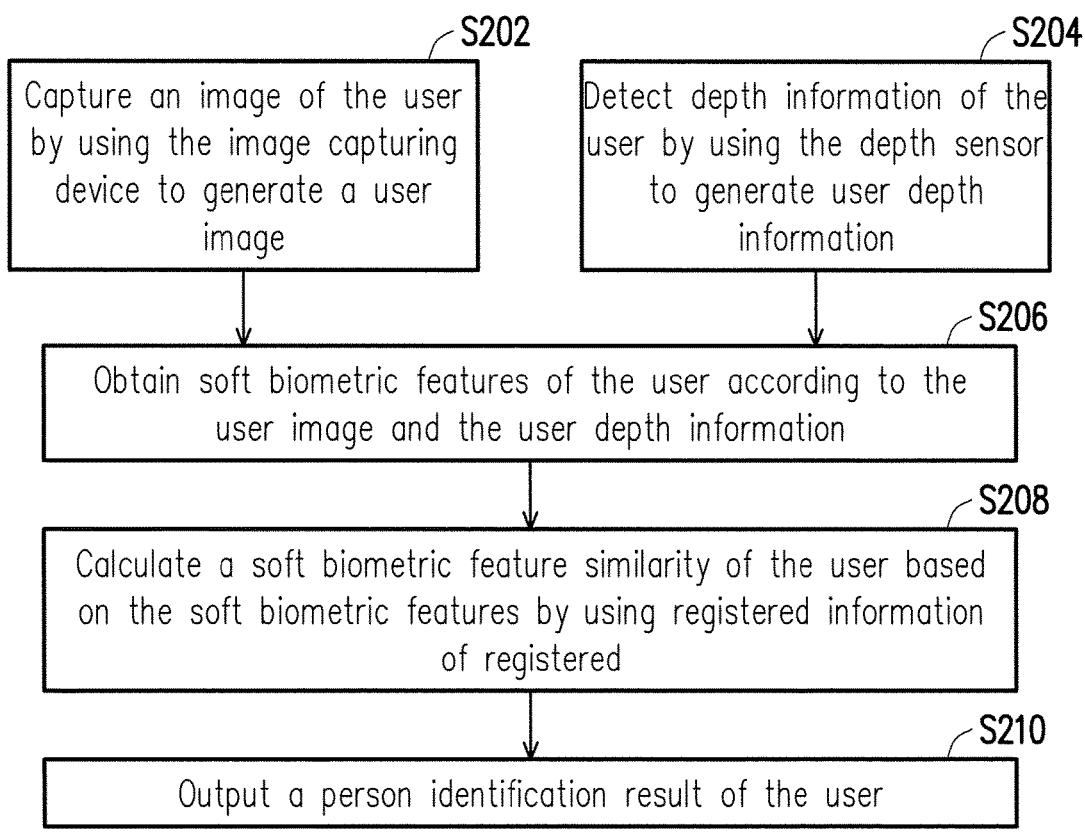
FIG. 2 illustrates a flowchart of a proposed method for long-distance person identification in accordance with one of the exemplary embodiments of the disclosure.

FIG. 2 illustrates a flowchart of a proposed method for long-distance person identification in accordance with one of the exemplary embodiments of the disclosure.

Referring to both FIG. 1 and FIG. 2, assume that a user is within a range that would be detectable by the image capturing device 110 and the depth sensor 120 of the person identification system 100. First, the processor 140 would capture an image of the user by using the image capturing device 110 to generate a user image (Step S202) and detect depth information of the user by using the depth sensor 120 to generate user depth information (Step S204). In detail, the image capturing device 110 may capture the image of the user of its front, and the depth sensor 120 may detect the depth information of the user of its front. The processor 140 may associate each pixel of the captured user image with the detected depth information to obtain the depth information corresponding to each of the pixels.

Next, the processor 140 would obtain soft biometric features of the user according to the user image and the user depth information (Step S206), where the soft biometric features may include silhouette information and human body features of the user. The silhouette information may be the shape and the pose angle of the user's upper body, and the human body features may be the size of the user's body part such as height, shoulder width, and head width. The processor 140 herein may obtain the soft biometric features of the user from the user image based on feature extraction and image segmentation algorithms.

In detail, the processor 140 may perform feature extraction on the user image based on a Haar-like feature classifier using an AdaBoost algorithm or a histogram of gradients to preliminarily obtain a candidate human body block from the user image, where the candidate human body block may be a rectangular range with a full or upper body of the user. Next, the processor 140 may perform coarse foreground-background segmentation on the candidate human body block according to the user depth information and next perform fine foreground-background segmentation by using a GrabCut algorithm to extract a foreground region and set it as the silhouette information of the user.

In general, although the Grabcut algorithm may precisely separate a foreground from a background, sufficient candidate foreground and background information should be given beforehand. Thus, a decent segmentation result would be obtained by using such algorithm with a semi-interactive approach. However, the processor 140 in the present exemplary embodiment may perform morphological image processing and thinning processing on the user depth information and set the processed depth information as the required foreground and background information used in the GrabCut algorithm for completely automatic foreground-background segmentation.

Figure 3A:
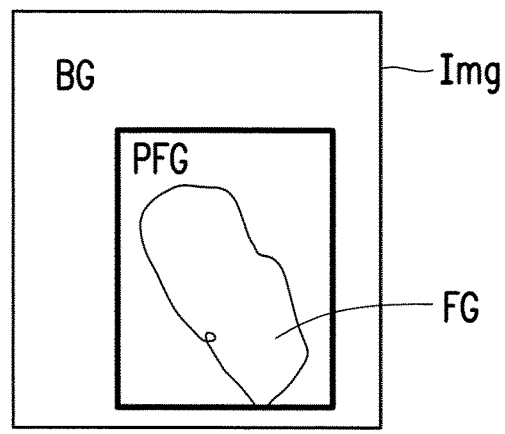
FIG. 3A illustrates a schematic diagram of an image in accordance with an existing GrabCut algorithm.

To be specific, an image may be classified into a background, a foreground, a possible background, and a possible foreground by using the existing GrabCut algorithm. The minimum requirement of such algorithm is to classify the image into the background and the possible foreground, and the foreground and the possible background may be manually done for a better segmentation result. Take FIG. 3A illustrating a schematic diagram of an image in accordance with an existing GrabCut algorithm as an example. A block FG would be a foreground segmented out from an image Img, and a block PFG (including a block FG) would be a possible foreground, and a block BF other than the block PFG would be a background. Hence, the segmentation result would be elevated if specific pixels in the block FG are correctly marked as the foreground.

Accordingly, the information used by the processor 140 may be the rectangular range that possibly exists the user, the depth information (referred to as "depth foreground"), and the user image. The depth information may be in a form of a depth map, and thus the depth foreground may also be referred to as "a depth foreground image". In detail, FIG. 3B illustrates a schematic diagram of image segmentation in accordance with an exemplary embodiment of the disclosure.

Figure 3B:
FIG. 3B illustrates a schematic diagram of image segmentation in accordance with an exemplary embodiment of the disclosure.
Figure 3B:
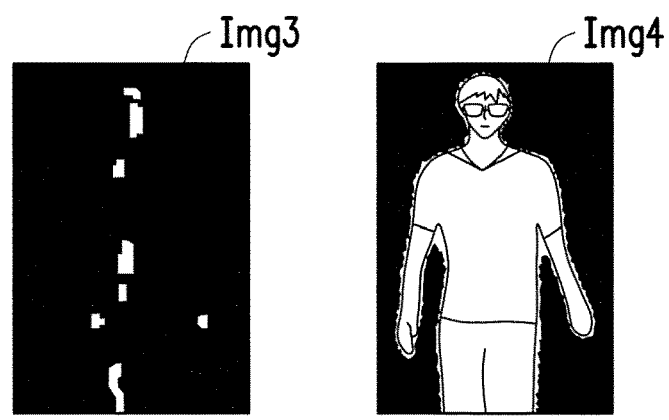

Referring to FIG. 3B, the processor 140 may perform morphological image processing on a coarsely determined depth foreground image Img1 according to depth information to fill holes and set it as a possible foreground to generate a morphological image Img2. Next, the processor 140 may perform thinning processing on the morphological image Img2 and mark it as a foreground to generate a thinning image Img3. The processor 140 may then associate the thinning image Img3 with an original user image to identify a foreground from the original user image. The processor 140 may next set remaining pixels within the rectangular range that possibly exists the user (the pixels not being marked as the foreground) as a background so as to generate a segmented foreground image Img4. Hence, effective foreground and background segmentation may not only provide precise silhouette information, but may also be informatively useful on human body feature recognition.

Revisiting FIG. 2, the processor 140 would calculate a soft biometric feature similarity of the user based on the soft biometric features by using registered information of registered users (Step S208) to output a person identification result accordingly (Step S210). In other words, before the person identification system 100 performs person identification on the user, it may request the user to perform registration to store registered information of the user in the memory 130. Similar to the steps of person identification, the processor 140 would capture images of the user with respect to different angles by using the image capturing device 110 to generate registered images and detect depth information of the user by using the depth sensor 120 to generate registered depth information. Next, the processor 140 would obtain registered soft biometric features of the user according to the registered images and the registered depth information. The processor 140 would set the user as the registered user and set his/her registered soft biometric features as the registered information for person identification.

In the present exemplary embodiment, the processor 140 may capture 10 images of the upper body of the user with his/her face facing straight toward the lens as well as two images of the upper body of the user with his/her face facing 45 degrees and 90 degrees toward the lens by using the image capturing device 110 for user registration. The facial expression of the user may not be necessarily the same in these 10 images. The processor 140 may perform feature extraction on the images of the upper body and perform two types of feature extraction on the images of the upper body with 0 degrees (i.e. one of the 10 images), with 45 degrees, and with 90 degrees by using a Fisherface algorithm. The first extracted feature would be the sizes of the human body features such as height, shoulder width, and head width based on the depth information, and the second extracted feature would be silhouette information obtained based on shape context comparison.

Hence, in terms of comparing the soft biometric features, the processor 140 would perform shape context comparison between the silhouette information of the user obtained in Step S206 and the registered silhouette information of the registered users so as to calculate silhouette similarities, where the registered user having a highest silhouette similarity with the user would be considered as a candidate user. Moreover, the processor 140 would perform size comparison between the human body features of the user obtained in Step S206 and the registered human body features of the candidate user so as to calculate a human body similarity. The processor 140 may calculate the silhouette information and the human body feature by using a support vector machine (SVM) algorithm based on the Euclidean distance. It should be noted that, in another exemplary embodiment, the processor 140 may perform human body feature comparison to obtain a candidate user and his/her human body similarity and then perform silhouette information comparison based on a registered image of such candidate user to obtain a silhouette similarity. The order of calculating the silhouette similarity and the human body similarity would not be restricted in the disclosure.

Next, the processor 140 would calculate the soft biometric features similarity according to the silhouette similarity and the human body similarity, for example, a weighted sum of the silhouette similarity and the human body similarity. As an example, assume that the silhouette similarity and the human body similarity have equal weights. The soft biometric features similarity may then be the sum of the silhouette similarity and the human body similarity.

Next, the processor 140 would output the person identification result according to the soft biometric feature similarity. Herein, the processor 140 may determine whether the soft biometric feature similarity is greater than a soft biometric feature threshold. If yes, the processor 140 would determine that the user is indeed the candidate user. If no, it represents that the person identification fails, and the processor 140 may, for example, return to Step S202 and Step S204 to re-perform image capture and depth calculation on the user. In an exemplary embodiment, assume that the person identification system 100 is used for home surveillance purposes, the processor 140 may inform the user through text message, e-mail, mobile application when the number of consecutive person identification failures exceeds a limit so as to provide a secure home environment.

The person identification in the aforementioned exemplary embodiment is based on soft biometric features. In another exemplary embodiment, the person identification system 100 would further use face recognition and daily outfit as auxiliary information for identification. In detail, FIG. 4 illustrates a flowchart of a method for long-distance person identification in accordance with another exemplary embodiment of the disclosure, where the steps of FIG. 4 may also be implemented by each component in the person identification system 100.

Figure 4:
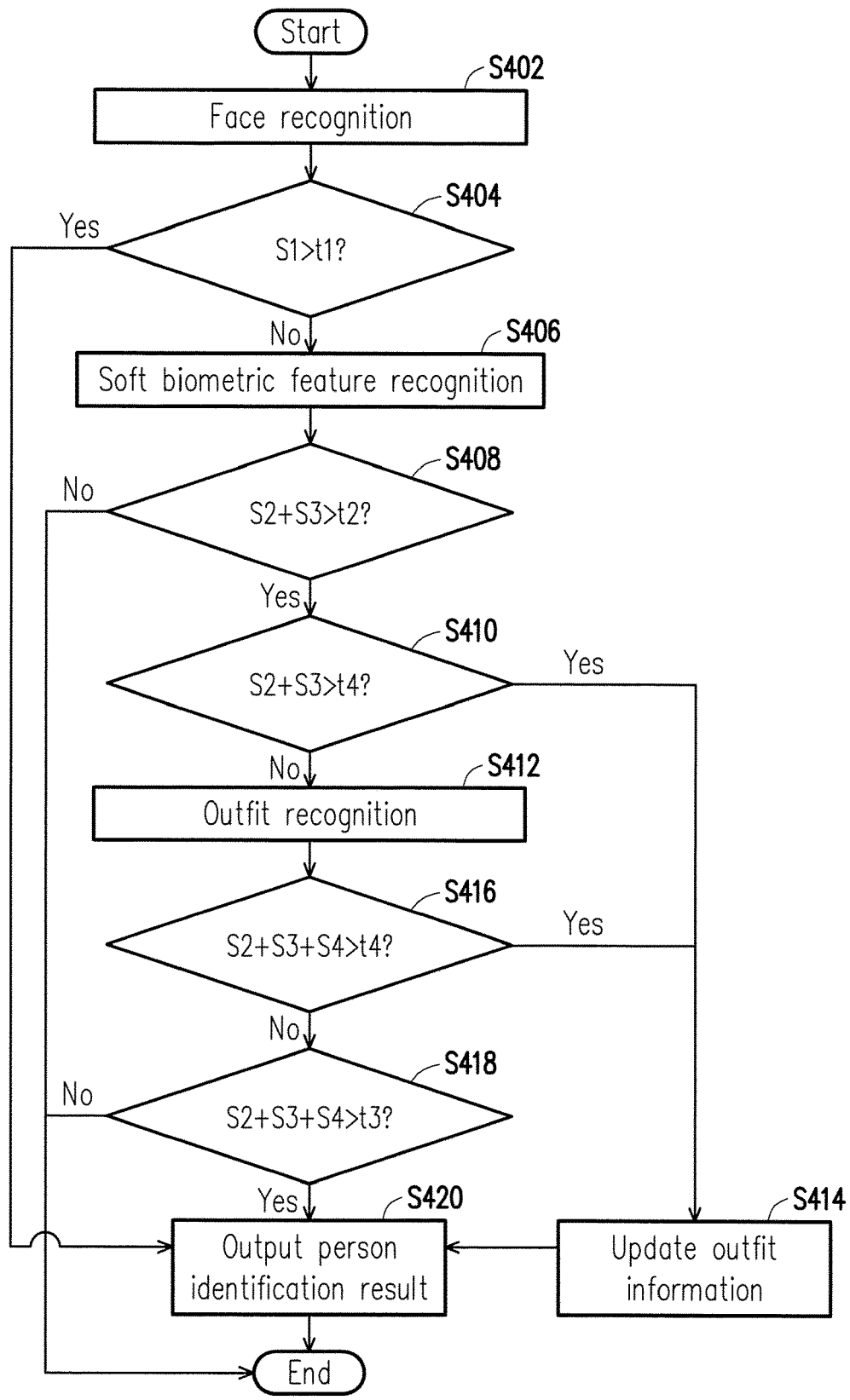
FIG. 4 illustrates a flowchart of a proposed method for long-distance person identification in accordance with another exemplary embodiment of the disclosure.

Referring to both FIG. 1 and FIG. 4, assume that the processor 140 has already captured a user image by using the image capturing device 110 and detected user depth information by using the depth sensor 120 as in Steps S202-S204. In the first stage of the person identification process, the processor 140 would perform face recognition on the captured user image by using registered images of registered users stored in the memory 130 based on any existing human face recognition algorithm (Step S402) so as to compare and identify the registered user having a highest face similarity with the user and set such registered user as a candidate user, where the face similarity between the user image and the registered image of the candidate user would be denoted as S1. Next, the processor 140 would determine whether the face similarity S1 of the user image is greater than a face threshold t1 (Step S404). If yes, it represents that the face recognition succeeds, and the processor 140 would directly output a person identification result (Step S420). That is, the user is the registered user with the highest face similarity. If no, it is possible that the user is facing slightly off to or back to the image capturing device 110 or the user is too far away from the image capturing device 110 to capture a suitable image for face identification, and the processor 140 would then enter the second stage of the person identification process.

In the second stage of the person identification process, the processor 140 would perform soft biometric feature recognition by using silhouette information and human body features (Step S406), where the implementation of the soft biometric feature identification may refer to the related description in Step S206 and would not be repeated herein for brevity sake. Next, the processor 140 would calculate a soft biometric feature similarity between the user and each of the registered users, where the soft biometric feature similarity includes a silhouette similarity S2 and a human body similarity S3. The registered user having the highest soft biometric feature similarity with the user would be considered as a candidate user. The way to calculate the soft biometric feature similarity may refer to the related description in Step S208 and would not be repeated herein for brevity sake.

In the present exemplary embodiment, the soft biometric feature similarity would be the sum of the silhouette similarity S2 and the human body similarity S3 (i.e. S2+S3). That is, the silhouette similarity S2 and the human body similarity S3 have equal weights. The processor 140 would determine whether the soft biometric feature similarity S2+S3 is greater than a soft biometric feature threshold t2 (Step S408). If no, the processor 140 would determine that the person identification fails and end the person identification process or re-perform image capture and depth calculation by using the image capturing device 110 and the depth sensor 120 respectively. If yes, before the processor 140 enters the third stage for outfit recognition, it would determine whether the soft biometric feature similarity S2+S3 is greater than a threshold t4 (referred to as "a maximal threshold t4") (Step S410), where t4>42. The reason for setting the maximal threshold t4 is that the greater the soft biometric feature similarity S2+S3, the higher the reliability of the person identification result in the second stage. Hence, when the soft biometric feature similarity S2+S3 exceeds a certain limit, there is no need to perform the third stage for outfit recognition, and the processor 140 would output the person identification result (Step S420). That is, the processor 140 would determine that the user is indeed the candidate user. On the other hand, when the soft biometric feature similarity S2+S3 is not greater than the soft biometric feature threshold t4, the processor 140 would enter the third stage for outfit recognition.

It should be noted that, during user registration, the processor 140 would obtain outfit features of the user according to the registered images. In the present exemplary embodiment, the outfit features include texture information and color information of the clothes. The processor 140 may perform texture analysis based on high-order local autocorrelation (HLAC) features to extract 25 features from a lower portion of upper images of the upper body with 0 degree, 45 degrees, and 90 degrees. Moreover, the processor 140 may perform color feature determination based on three channels formed by a combination of RGB. For example, the three channels may be R+G−B, R−G, and R+G. In another exemplary embodiment, the outfit features may further include accessories such as necklace, hat, bracelet, glasses for auxiliary purposes. The outfit features obtained by the processor 140 during the registration process would also set as the registered information and stored in the memory 130.

Referring back to FIG. 4, in the third stage of the person identification process, the processor 140 would obtain outfit features from the user image and perform outfit recognition on the outfit features (Step S412) to obtain an outfit similarity S4 between the user and the candidate user. Since there may exist a huge variation in a same user's outfits and since different users may have similar outfits, the outfit recognition may be only for auxiliary purposes. The processor 140 may not perform any person identification purely based on the outfit features. Hence, the processor 140 would output the person identification result of the user according to the outfit similarity along with the soft biometric feature similarity in this stage.

In the present exemplary embodiment, the processor 140 would sum the outfit similarity and the soft biometric feature similarity (i.e. S2+S3+S4, referred to as "a similarity sum"). That is, these similarities are equally weighted. The processor 140 would determine whether the similarity sum S2+S3+S4 is greater than the maximal threshold t4 (Step S416). If yes, the processor 140 would determine that the user is indeed the candidate user, update the current outfit features of the user to his/her registered outfit information (Step S414) to provide a more robust outfit recognition in the future, and output the person identification result (Step S420). That is, the processor 140 would determine that the user is indeed the candidate user. Moreover, in Step S410, when the soft biometric feature similarity S2+S3 is greater than the soft biometric feature threshold t4, it may also update the current outfit features of the user to his/her registered outfit information.

On the other hand, to prevent a false determination due to unsimilar outfit features, when the processor 140 determines that the similarity sum S2+S3+S4 is not greater than the maximal threshold t4, it would lower the determination threshold and further determine whether the similarity sum S2+S3+S4 is greater than a maximal threshold t3 (Step S418), where t4>t3>t2. If no, the processor 140 would determine that the person identification fails and end the person identification process or re-perform image capture and depth calculation by using the image capturing device 110 and the depth sensor 120 respectively. If yes, the processor 140 would output the person identification result (Step S420). That is, the processor 140 would determine that the user is indeed the candidate user but would not update the outfit information.

The disclosure also provides a non-transitory computer readable medium, which records computer program composed of a plurality of program instructions (for example, an organization chart, establishing program instruction, a table approving program instruction, a setting program instruction, and a deployment program instruction, etc.), and these program instructions are loaded into the processor 140 of the person identification system 100 and executed by the same to accomplish various steps of the method for long-distance person identification.

In view of the aforementioned descriptions, the method, the system, and the computer-readable recording medium proposed in the disclosure provide a non-contact and effective person identification approach on a basis of soft biometric features. Moreover, face recognition as well as daily outfits are also provided as auxiliary information. As opposed to the existing solutions for person identification, the disclosure is able to provide efficient and accurate person identification in a non-contact fashion.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for long-distance person identification, applicable to a system having an image capturing device and a depth sensor, wherein the method comprises the following steps:
    capturing an image of a user by using the image capturing device to generate a user image;
    detecting depth information of the user by using the depth sensor to generate user depth information;
    obtaining a plurality of soft biometric features of the user according to the user image and the user depth information, wherein the soft biometric features comprise silhouette information and a plurality of human body features of the user; and
    calculating a soft biometric feature similarity of the user based on the soft biometric features by using registered information of a plurality of registered users, and outputting a person identification result according to the soft biometric feature similarity of the user.

2. The method according to claim 1, wherein the step of obtaining the silhouette information of the soft biometric features of the user comprises:
    extracting a block having the user from the user image, and obtaining depth information corresponding to the block from the user depth information to generate a depth foreground image;
    performing morphological image processing and thinning processing on the depth foreground image to generate a processed depth foreground image; and
    performing GrabCut processing on the user image according to the processed depth foreground image to segment out a foreground region from the user image, and setting the foreground region as the silhouette information.

3. The method according to claim 1, wherein the step of obtaining the human body features of the soft biometric features of the user comprises:
    calculating sizes of the human body features according to the user depth information.

4. The method according to claim 3, wherein the sizes of the human body features comprise a height, a shoulder width, and a head width of the user.

5. The method according to claim 1, wherein before the steps of capturing the image of the user by using the image capturing device and detecting the depth information of the user by using the depth sensor, the method further comprises:
    capturing a plurality of images of the user with respect to different angles by using the image capturing device to generate a plurality of registered images of the user;
    detecting depth information of the user by using the depth sensor to generate registered depth information of the user;
    obtaining a plurality of registered soft biometric features according to the registered images and the registered depth information; and
    setting the user as one of the registered users, and setting the registered images and the registered soft biometric features of the user as the registered information of the user.

6. The method according to claim 1, wherein the registered information of each of the registered users comprises a plurality of registered soft biometric features, wherein each of the soft biometric features comprises registered silhouette information and a plurality of registered human body features, and wherein the step of calculating the soft biometric feature similarity of the user based on the soft biometric features by using the registered information of the registered users, and outputting the person identification result according to the soft biometric feature similarity of the user comprises:
    performing shape context comparison between the silhouette information and the registered silhouette information of the registered users so as to obtain a silhouette similarity between the user and a candidate user among the registered users, wherein the user has a highest silhouette similarity with the candidate user;
    performing size comparison between the human body features and the registered human body features of the candidate user so as to calculate a human body similarity between the user and the candidate user;
    calculating the soft biometric features similarity according to the silhouette similarity and the human body similarity; and
    outputting the person identification result according to the soft biometric feature similarity of the user.

7. The method according to claim 6, wherein the step of outputting the person identification result according to the soft biometric feature similarity of the user comprises:
  determining whether the soft biometric feature similarity is greater than a soft biometric feature threshold;
  in response to the soft biometric feature similarity being greater than the soft biometric feature threshold, determining that the user is the candidate user; and
  in response to the soft biometric feature similarity not being greater than the soft biometric feature threshold, determining that the person identification fails.

8. The method according to claim 6, wherein the user information of each of the registered users comprises a plurality of registered outfit features, and wherein the step of outputting the person identification result according to the soft biometric feature similarity of the user further comprises:
  obtaining a plurality of outfit features from the user image;
  performing outfit recognition on the outfit features by using the registered outfit features of the candidate user so as to obtain an outfit similarity of the user; and
  outputting the person identification result of the user according to the outfit similarity and the soft biometric similarity.

9. The method according to claim 8, wherein the step of outputting the person identification result of the user according to the outfit similarity and the soft biometric similarity further comprises:
  updating the registered outfit features of the user by using the outfit features.

10. The method according to claim 8, wherein the outfit features comprise texture information and color information of clothes.

11. The method according to claim 1, wherein the registered information of each of the registered users comprises a plurality of registered images, and wherein the step of calculating the soft biometric feature similarity of the user based on the soft biometric features by using the registered information of the registered users, and outputting the person identification result according to the soft biometric feature similarity of the user comprises:
  performing face recognition on the user image by using the registered images of the registered users so as to obtain a face similarity between the user and a candidate user among the registered users, wherein the user has a highest face similarity with the candidate user;
  determining whether the face similarity is greater than a face threshold;
  in response to the face similarity being greater than the face threshold, directly outputting the person identification result of the user; and
  in response to the face similarity not being greater than the face threshold, performing calculation of the soft biometric feature similarity between the user and the candidate user, and outputting the person identification result according to the soft biometric feature similarity of the user.

12. A person identification system comprising:
  an image capturing device, configured to capture images;
  a depth sensor, configured to detect depth information;
  a memory, configured to store registered information of a plurality of registered users; and
  a processor, coupled to the image capturing device, the depth sensor, and the memory, and configured to perform the following steps:
    capturing an image of a user by using the image capturing device to generate a user image;
    detecting depth information of the user by using the depth sensor to generate user depth information;
    obtaining a plurality of soft biometric features of the user according to the user image and the user depth information, wherein the soft biometric features comprise silhouette information and a plurality of human body features of the user; and
    calculating a soft biometric feature similarity of the user based on the soft biometric features by using the registered information of the registered users, and outputting a person identification result according to the soft biometric feature similarity of the user.

13. The system according to claim 12, wherein the processor extracts a block having the user from the user image, obtains depth information corresponding to the block from the user depth information to generate a depth foreground image, performs morphological image processing and thinning processing on the depth foreground image to generate a processed depth foreground image, performs GrabCut processing on the user image according to the processed depth foreground image to segment out a foreground region from the user image, and sets the foreground region as the silhouette information.

14. The system according to claim 12, wherein the processor calculates sizes of the human body features according to the user depth information.

15. The system according to claim 14, wherein the sizes of the human body features comprise a height, a shoulder width, and a head width of the user.

16. The system according to claim 12, wherein the processor further captures a plurality of images of the user with respect to different angles by using the image capturing device to generate a plurality of registered images of the user, detects depth information of the user by using the depth sensor to generate registered depth information of the user, obtains a plurality of registered soft biometric features according to the registered images and the registered depth information, sets the user as one of the registered users, and sets the registered images and the registered soft biometric features of the user as the registered information of the user.

17. The system according to claim 12, wherein the registered information of each of the registered users comprises a plurality of registered soft biometric features, wherein each of the soft biometric features comprises registered silhouette information and a plurality of registered human body features, wherein the processor performs shape context comparison between the silhouette information and the registered silhouette information of the registered users so as to obtain a silhouette similarity between the user and a candidate user among the registered users, performs size comparison between the human body features and the registered human body features of the candidate user so as to calculate a human body similarity between the user and the candidate user, calculates the soft biometric features similarity according to the silhouette similarity and the human body similarity, and outputs the person identification result according to the soft biometric feature similarity of the user, and wherein the user has a highest silhouette similarity with the candidate user.

18. The system according to claim 17, wherein the processor determines whether the soft biometric feature similarity is greater than a soft biometric feature threshold, determines that the user is the candidate user in response to the soft biometric feature similarity being greater than the soft biometric feature threshold, and determines that the person identification fails in response to the soft biometric feature similarity not being greater than the soft biometric feature threshold.

19. The system according to claim 17, wherein the user information of each of the registered users comprises a plurality of registered outfit features, and wherein the processor further obtains a plurality of outfit features from the user image, performs outfit recognition on the outfit features by using the registered outfit features of the candidate user so as to obtain an outfit similarity of the user, and outputs the person identification result of the user according to the outfit similarity and the soft biometric similarity.

20. The system according to claim 19, wherein the processor further updates the registered outfit features of the user by using the outfit features.

21. The system according to claim 19, wherein the outfit features comprise texture information and color information of clothes.

22. The system according to claim 12, wherein the registered information of each of the registered users comprises a plurality of registered images, and wherein the processor performs face recognition on the user image by using the registered images of the registered users so as to obtain a face similarity between the user and a candidate user among the registered users, determines whether the face similarity is greater than a face threshold, directly outputs the person identification result of the user in response to the face similarity being greater than the face threshold, performs calculation of the soft biometric feature similarity between the user and the candidate user and outputs the person identification result according to the soft biometric feature similarity of the user in response to the face similarity not being greater than the face threshold, wherein the user has a highest face similarity with the candidate user.

23. A non-transitory computer-readable recording medium, recording programs to be loaded into a processor of a person identification system to perform steps of:
  capturing an image of a user by using the image capturing device to generate a user image;
  detecting depth information of the user by using the depth sensor to generate user depth information;
  obtaining a plurality of soft biometric features of the user according to the user image and the user depth information, wherein the soft biometric features comprise silhouette information and a plurality of human body features of the user; and
  calculating a soft biometric feature similarity of the user based on the soft biometric features by using registered information of a plurality of registered users, and outputting a person identification result according to the soft biometric feature similarity of the user.

* * * * *